US011711302B2

(12) United States Patent
Roy et al.

(10) Patent No.: US 11,711,302 B2
(45) Date of Patent: Jul. 25, 2023

(54) DYNAMIC OUTROUTE LOAD BALANCING AND MULTICAST (71) Applicant: HUGHES NETWORK SYSTEMS, LLC, Germantown, MD (US)

(72) Inventors: Satyajit Roy, Germantown, MD (US); George Choquette, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 62 days.

(21) Appl. No.: 17/329,082

(22) Filed: May 24, 2021

(65) Prior Publication Data
US 2021/0367891 A1 Nov. 25, 2021

Related U.S. Application Data (60) Provisional application No. 63/029,396, filed on May 22, 2020.

(51) Int. Cl.
| H04L 12/803 | (2013.01) |
| H04L 12/18 | (2006.01) |
| H04B 7/185 | (2006.01) |
| H04L 12/26 | (2006.01) |
| H04L 12/24 | (2006.01) |
| H04L 1/00 | (2006.01) |
| H04L 47/125 | (2022.01) |
| H04L 41/0816 | (2022.01) |

(Continued)

(52) U.S. Cl.
CPC ............ *H04L 47/125* (2013.01); *H04B 7/185* (2013.01); *H04L 1/0003* (2013.01); *H04L 1/0009* (2013.01); *H04L 12/18* (2013.01); *H04L 41/0668* (2013.01); *H04L 41/0816* (2013.01); *H04L 43/16* (2013.01)

(58) Field of Classification Search
CPC ..... H04B 7/185; H04L 1/0003; H04L 1/0009; H04L 12/18; H04L 41/0668; H04L 41/0816; H04L 43/16; H04L 47/125; H04L 12/1877; H04L 12/189; H04L 41/0663; H04L 45/16; H04L 45/24
See application file for complete search history.

(56) References Cited

U.S. PATENT DOCUMENTS

2015/0117235 A1   4/2015   Bhanage et al.
2016/0359551 A1   12/2016  Roy
(Continued)

OTHER PUBLICATIONS

International Search Report and Written Opinion issued in International Application No. PCT/US21/33944, dated Aug. 23, 2021.

*Primary Examiner* — Derrick V Rose
(74) *Attorney, Agent, or Firm* — Potomac Technology Law, LLC (57) ABSTRACT An apparatus, system, and method for balancing traffic loads on beam outroutes that contain both multicast and unicast traffic. An outroute is designated for supplying at least multicast traffic within a beam of a satellite communication system. Terminals interested in receiving the multicast traffic are moved to the designated outroute. Traffic loads on all outroutes within the beam, including the designated outroute, are compared to determine if variations in the traffic loads exceed a predetermined threshold. A load balancing routine is performed to redistribute the traffic loads on all outroutes, while excluding any terminal that is actively receiving the multicast traffic from the load balancing routine.

20 Claims, 9 Drawing Sheets (51) Int. Cl.
*H04L 41/0668* (2022.01)
*H04L 43/16* (2022.01)

(56) References Cited

U.S. PATENT DOCUMENTS

| | | |
|---|---|---|
| 2017/0223573 A1 | 8/2017 | Torres et al. |
| 2018/0152351 A1 | 5/2018 | Roy et al. |
| 2019/0104132 A1 | 4/2019 | Cooper et al. |
| 2020/0112883 A1 | 4/2020 | Naik et al. |

DYNAMIC OUTROUTE LOAD BALANCING AND MULTICAST

CROSS-REFERENCE TO RELATED APPLICATION

The present application claims priority to U.S. Provisional Patent Application No. 63/029,396 filed May 22, 2020, and entitled "DYNAMIC OUTROUTE LOAD BALANCING AND MULTICAST", the entire disclosure of which is incorporated herein by reference.

BACKGROUND INFORMATION

Data networks are utilized for transmitting and receiving information using various platforms, or devices. Consumers are also capable of accessing data networks through various types of infrastructure (e.g., cable, DSL, fiber, etc.). Satellite networks have emerged as an option for consumers to access data, as well as voice, networks. Satellite communication systems utilize various types of satellite terminals (or simply "terminals"), including fixed, portable, transportable, etc., to establish communication over the satellite network. The terminal allows a consumer to access, for example, data networks via multiple user devices. The terminal is associated with a gateway which provides a point of connection to terrestrial data networks for the satellite network.

Gateways are typically configured to support links to many terminals and other satellite communication devices. Since each terminal (and satellite communication device) has a fixed link to a gateway, it can be difficult to manage and distribute load in a manner which maintains required quality of service (QoS) levels. Dynamic Outroute Load balancing can be used to support automatic load balancing across multiple outroutes within a beam to ensure that network resources are being fully utilized, spectrum is being optimally utilized for providing user throughputs during busy periods, and quality of service (QoS) can be provided at similar level for all terminals. This can prevent, for example, loss of active TCP connections and traffic after a terminal moves to another outroute due to load balancing. This dynamic outroute load balancing can also eliminate manual balancing workload, and allow a business system or other entity to direct a terminal installation to a particular outroute to promote balance.

Two types of load balancing methods are available, namely network assisted, but terminal initiated and network initiated. In network assisted load balancing, the terminal moves to another outroute for load balancing purposes when idle, i.e. not actively sending traffic. For network initiated load balancing, the network commands a terminal's outroute move regardless of whether or not that terminal has active traffic.

When multicast sessions are required, the gateway replicates and forwards the multicast stream over one or more respective outroute carriers of one or more spot beams of a satellite. When the gateway is configured to be in a static forwarding mode, the multicast stream is replicated and forwarded regardless of whether any terminals are arranged to actively receive the multicast stream. When the gateway is configured to be in a dynamic forwarding mode, the multicast stream is replicated and forwarded over multiple outroutes of multiple spot beams only when at least one respective terminal is arranged to actively receive the multicast stream via each of the multiple outroutes of the multiple spot beams.

The introduction of dynamic outroute load balancing in systems that carry multicast traffic can adversely affect system performance when terminals are moved to distribute loading across multiple available outroutes in a beam. For example, terminals receiving multicast traffic can be spread across outroutes, thereby requiring the same multicast sessions to be sent on every outroute. Such redundancy can degrade system performance and waste bandwidth that could be used to carry other traffic. Based on the foregoing, there is at least a need for an approach for automatically optimizing load balancing to minimize load capacity used for multicast, without having to hard code such assignments, while also leveraging multiple outroutes for different multicast sessions.

BRIEF SUMMARY

An apparatus and method are disclosed for balancing traffic loads on beam outroutes containing both multicast and unicast traffic are described. According to an embodiment, the method includes: designating an outroute for supplying at least multicast traffic within a beam of a satellite communication system; comparing traffic loads on all outroutes within the beam, including the designated outroute; determining if variations in the traffic loads exceed a predetermined threshold; performing a load balancing routine, if the variations exceed the predetermined threshold, to redistribute the traffic loads on all outroutes by moving at least one terminal to a destination outroute; and excluding, from the load balancing routine, any terminal in the designated outroute that is actively receiving the multicast traffic.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, system, and method for balancing beam outroutes containing both multicast and unicast traffic are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
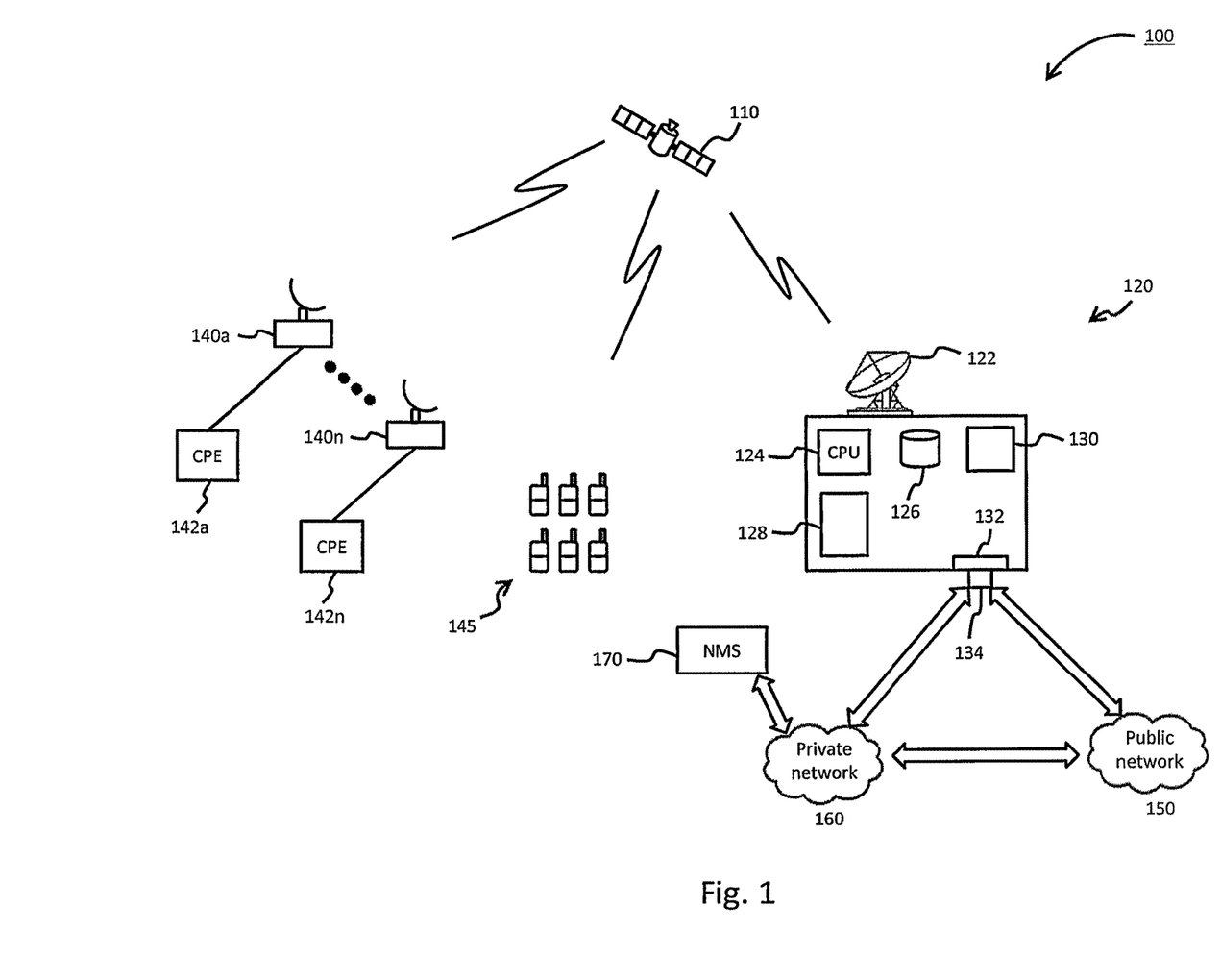
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
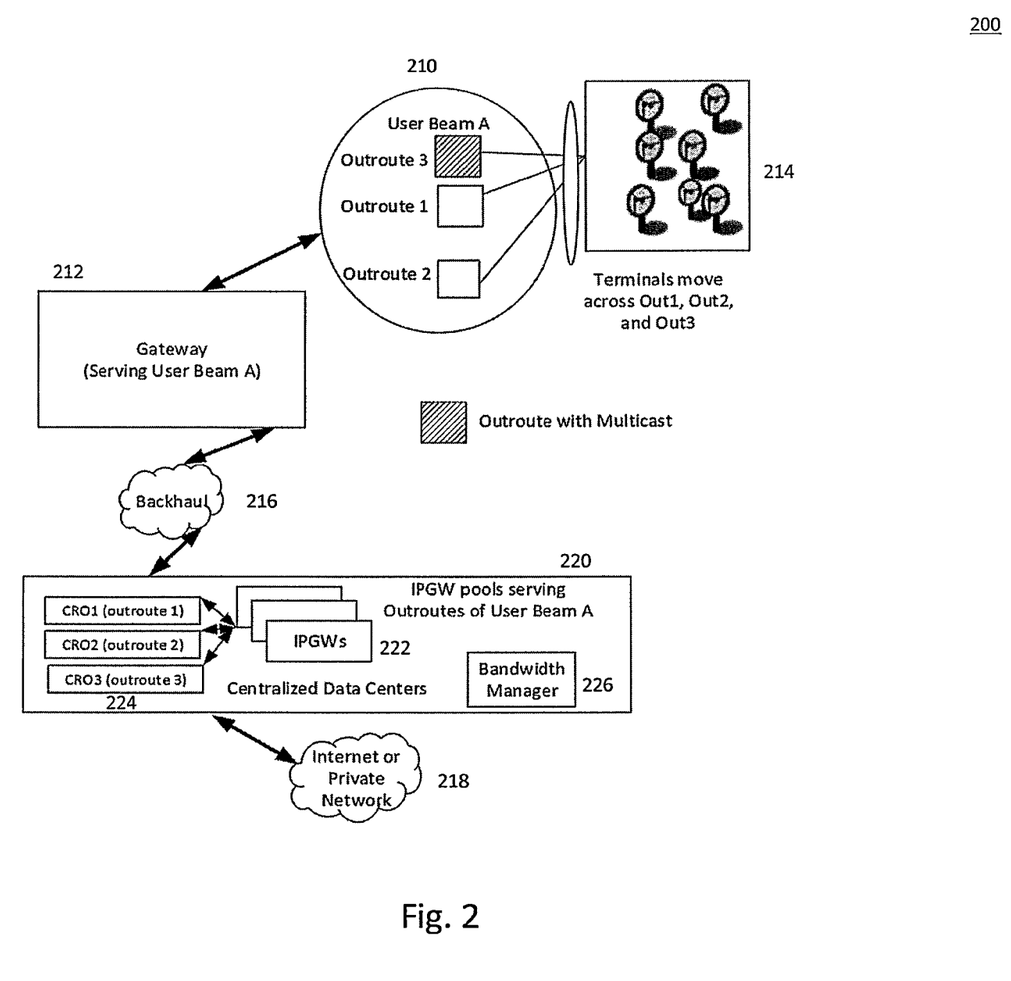
FIG. 2 is a diagram for illustrating load balancing of unicast and multicast traffic in the system of FIG. 1, according to one embodiment.

FIG. 2 illustrates a system 200 for load balancing of unicast and multicast traffic, according to one or more embodiments. The system 200 includes coverage beams 210 (only one shown) which provide communication by means of one or more outroutes. For example, the illustrated coverage beam 210 includes three outroutes, namely outroute_1, outroute_2, and outroute_3. It should be noted, however, that other coverage beams (or beams) 210 can include additional outroutes or less outroutes. The beams 210 overlay specific geographical areas in order to communicate with a gateway 212 and terminals 214. Although not shown in FIG. 2, the system 200 includes a satellite which generates the beams 210 to facilitate a bent pipe communication path in the manner shown in FIG. 1. The outroutes can also be configured to carry specific types of traffic. As illustrated in FIG. 2, for example, only outroute_3 is designated for supplying multicast services, while outroute_1 and outroute_2 provide point to point (or unicast) traffic.

The gateway 212 can connect to a network such as a backhaul network 216 in order to establish communication with one or more centralized data centers 218 such as the NMS shown in FIG. 1. Depending on the specific implementation, the gateway 212 can also utilize public/private networks 218 to communicate with the data centers 220. According to the illustrated embodiment, the data center 220 can include IP gateways (IPGW) 222, code rate organizers (CRO) 224, and a bandwidth manager 226. The IPGW 222 is configured to provide layer-2 and layer-3 functionality by processing packets transmitted to, and received from, the internet 218. The IPGW 222 can include, depending on the specific implementation, a spoofer for acknowledging packets received at the gateway 212 such as transmission control protocol (TCP) and User Datagram Protocol (UDP) packets. Furthermore, a single IPGW or a pool of IPGW can be utilized.

The CRO 224 is configured to determine the modulation and coding applied to the signal stream in order to generate an output signal which optimizes spectrum utilization. For example, the CRO 224 can estimate bandwidth capacity and arrange incoming data from the IPGW 222 into a data stream which optimally utilizes available bandwidth when transmitted to the terminals 214. According to one or more embodiments, the CRO 224 can be configured to dynamically adjust the modulation and coding (ModCod) used for a particular outroute in order to improve link conditions or to change the size of multicast outroutes based on the traffic load of all outroutes within the beam.

The bandwidth manager 226 is configured to allocate bandwidth for all terminals 214 supported by the gateway 212. The bandwidth manager 226 can therefore communicate with the gateway 212, IPGW 222, and CRO 224 in order to obtain information pertaining to bandwidth efficiency when allocating bandwidth to the terminals 214. While FIG. 2 illustrates the data center 220 as being remotely located from the gateway 212, it should be noted that they can be collocated. Additionally, the functionality of the data center 220 can also be incorporated into hardware and/or software components of the gateway 212.

According to various embodiments, the system 200 can assign multicast outroutes in either a static or dynamic manner. Using the static approach, the system 200 can designate a particular outroute for all multicast traffic (or multicast services) either permanently or for an extended period. Any terminal 200 wishing to receive multicast services would remain on the designated outroute (i.e., multicast outroute). The multicast outroute is also capable of carrying unicast traffic in order to simultaneously provide multicast traffic together with unicast traffic such as internet protocol (IP) based services. Furthermore, terminals 214 that are only carrying unicast traffic can remain on the multicast outroute.

In the dynamic case, the IPGW 222 (i.e., the multicast sender on the outroute) automatically selects or designates an outroute for multicast traffic. The IPGW 222 then announces on all outroutes within the beam that the multicast is coming over the selected outroute. All terminals 214 interested in receiving the multicast would automatically move to the selected outroute. As discussed in greater detail below, load balancing routines can be implemented to move other terminals 214 away from the selected multicast outroute. In many cases, upcoming multicast session schedules are known as well as the particular start time and duration. For example, multicasts using HLS (HTTP Live Streaming) protocol, popular TV show broadcasts, and pay-per-view events, to name a few, etc. can be prescheduled because they have known dates, start time, duration, etc. In such cases, the IPGW 222 can periodically announce the session multicast group ID, start time, and the multicast outroute ID over all outroutes on the beam 210 prior to the start (e.g., 2 hours) of the multicast session. Terminals 214 interested in receiving this multicast session can automatically move to the announced multicast outroute just before the start time. Furthermore, information necessary for validating conditional access to the multicast session can be provided to all appropriate terminals 214 before starting the multicast.

During normal operations the amount of traffic carried over outroutes within the beam 210 can vary such that the traffic load across the outroutes becomes unbalance, thereby resulting in inefficient use of the satellite link. Such a condition can sometimes result from multiple terminals 214 switching to a multicast outroute (i.e., outroute_3) in order to access a multicast service. If the traffic loads of each outroute were balanced prior to the terminals 214 switching to the multicast outroute, the traffic loads will now be unbalanced. Specifically, the multicast outroute will now have an increased traffic load relative to the other outroutes due to the additional terminals 214. Furthermore, certain complications can arise due to the designation of a multicast outroute wherein terminals 214 receiving the multicast must remain.

According to various embodiments, different types of load balancing routines can be performed depending on the amount of imbalance which currently exists. The load balancing routines also take into account the need for terminals 214 receiving a multicast session to remain within the designated multicast outroute. This is done without having to replicate the multicast traffic on the other outroutes. One type of load balancing can be independently initiated by each terminal, and another type can be initiated by the network (e.g., via the gateway or bandwidth manager). Different threshold values can be set, for example, to select or trigger a particular type of load balancing routine. The threshold values can be based on variations between the traffic load on each outroute. The specific manner in which the variations are determined can be system design and implementation. For example, the variations can be based on the relative difference between the outroute having the highest traffic load and the outroute having the lowest traffic. The two threshold values can be selected such that a lower threshold (e.g., 15%) is used to trigger a terminal initiated load balance, while a higher threshold (e.g., 25%) is used to trigger a network initiated load balance.

According to the disclosed embodiments, terminal initiated load balancing is dynamically performed on a per terminal basis. The data center 220 generates a load metric for each outroute within the beam 210. The load metrics are subsequently broadcast to all terminals 214 within the beam 210. Each terminal 214 utilizes this information to independently determine if it is currently in an outroute with a high traffic load. For example, the terminal 214 can utilize the first threshold (e.g., 15%) to initiate load balancing if the traffic load of its current outroute is 15% greater than the lowest outroute traffic load, or other type of traffic variation that can be subject to the first threshold. The terminal 214 can then move to the outroute having the lowest traffic load. Since the traffic load information is broadcast to all terminals 214 within the beam 210, each terminal can periodically utilize this information to move to the most efficient outroute, thus balancing the traffic load across all outroutes. The data center 220 can also establish predetermined intervals at which terminals 214 can check the first threshold to see if load balancing should be performed. Multiple intervals can also be established such that groups of terminals 214 check the first threshold to see if load balancing should be performed instead of all terminals simultaneously or randomly.

According to the disclosed embodiments, one or more outroutes within the beam 210 can be designated for the multicast service delivery. Outroute_3, for example, has been designated for the multicast delivery. Terminals 214 that are currently receiving the multicast service must therefore remain on outroute_3. However, outroute_3 carries both unicast and multicast traffic, and contains terminals 214 receiving unicast traffic as well as terminals 214 receiving both unicast and multicast traffic. This is necessary because terminals 214 receiving the multicast traffic are typically engaged in at least one unicast session simultaneously.

According to at least one embodiment, the terminal initiated load balancing routine is overridden if a terminal 214 is currently receiving the multicast session. More particularly, terminals 214 that are currently within the multicast outroute will not move regardless of the traffic load in the multicast outroute relative to other outroutes in the beam 210. Terminals 214 in the multicast outroute that are only involved with unicast traffic, however, would move to another outroute if the first threshold is exceeded. According to an embodiment, consideration can be given to the multicast bit rates occupying the multicast outroute, since these could change from time to time based on the link condition of active terminals 214. Furthermore, the unicast traffic of the terminals participating in multicast reception is also taken into consideration for the load metric (traffic load) calculation.

As previously discussed, multiple thresholds can be established in order to trigger different types of load balancing. If a second threshold is reached, a network initiated load balancing routine can be implemented. For example, the gateway 212 and/or data center 220 (particularly the bandwidth manager 226 and the IPGW 222) can initiate the load balancing routine. According to an embodiment, the data center can monitor Internet Group Management Protocol (IGMP) or Multicast Listener Discovery (MLD) join messages from the terminals 214 in order to determine which will be receiving multicast sessions. The network initiated load balancing routine would not move any of the terminals 214 determined to be receiving the multicast sessions from the multicast outroute.

Since terminals 214 that are actively receiving a multicast session are not moved, it is possible that the traffic load on the multicast outroute can become much higher than the traffic load of the other outroutes in the beam 210. According to one or more embodiments, the data center 220 can take various steps to prevent or reduce overload on an outroute or beam with only multicast traffic. A threshold committed information rate (CIR) can be established for each multicast outroute. The threshold can be statically configured or derived based on the available estimated capacity of a beam 210 and the portion of the beam that can be used for multicast traffic. Different beams 210 can also have different configurations and maximum allowed CIR for multicast traffic.

According to an embodiment, a separate threshold can be set for the demand in multicast traffic. If the current demand for multicast traffic exceeds the threshold, multicast sessions and their respective priorities can be used to block lower priority multicast sessions so as to avoid dropping packets from the higher priority sessions. This can prevent multicast packets from being randomly dropped or discarded, thereby affecting all multicast sessions. Depending on the specific implementation, such a threshold can be set per virtual network operator (VNO). When a beam/outroute is carrying multicast sessions, the difference between the estimated beam/outroute capacity and the CIR currently used for multicast traffic can also be considered for the load balancing of unicast traffic across various outroutes within the beam 210.

If the system 200 includes a flexible payload reconfigurable satellite, the position and size of a beam can be dynamically adapted to accommodate the number of terminals 214 receiving or attempting to receive the multicast traffic. According to one or more embodiments, a machine learning based analytics procedure can be used to predict the locations of predominant receivers of specific multicast traffic sessions. Furthermore, reconfigurations in the size and location of beams can be predefined based on static planning of multicast sessions and targeted receivers. Prior to the start of specific multicast sessions that will be broadcast to specific locations, the satellite payload can be switched or reconfigured automatically. When the multicast sessions end, the satellite payload configuration is automatically reversed.

Figure 3:
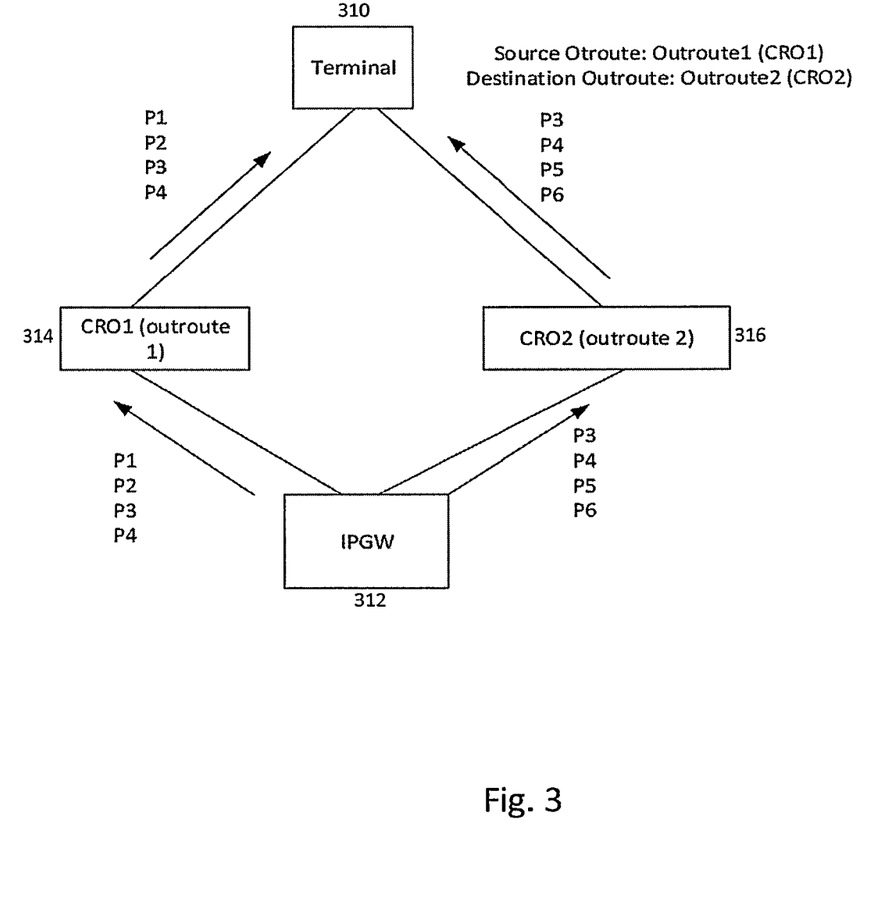
FIG. 3 is a diagram for illustrating reduction of traffic loss during load balancing operations, according to one embodiment.

FIG. 3 illustrates an embodiment for reducing or preventing traffic loss during load balancing operations. When a terminal 310 will move from a source (or first) outroute to a destination (or second) outroute as a result of load balancing, the IPGW 312 replicates traffic between the source and destination outroutes of the terminal 310. More particularly, the IPGW 312 replicates forward link traffic of a terminal 310 (moving or selected to be moved) to both the source outroute CRO 314 and the destination outroute CRO 316 during the switching or moving process. According to such a feature, the system of FIG. 2, for example, can reduce or minimize traffic loss or outage, particularly for UDP traffic.

Figure 4:
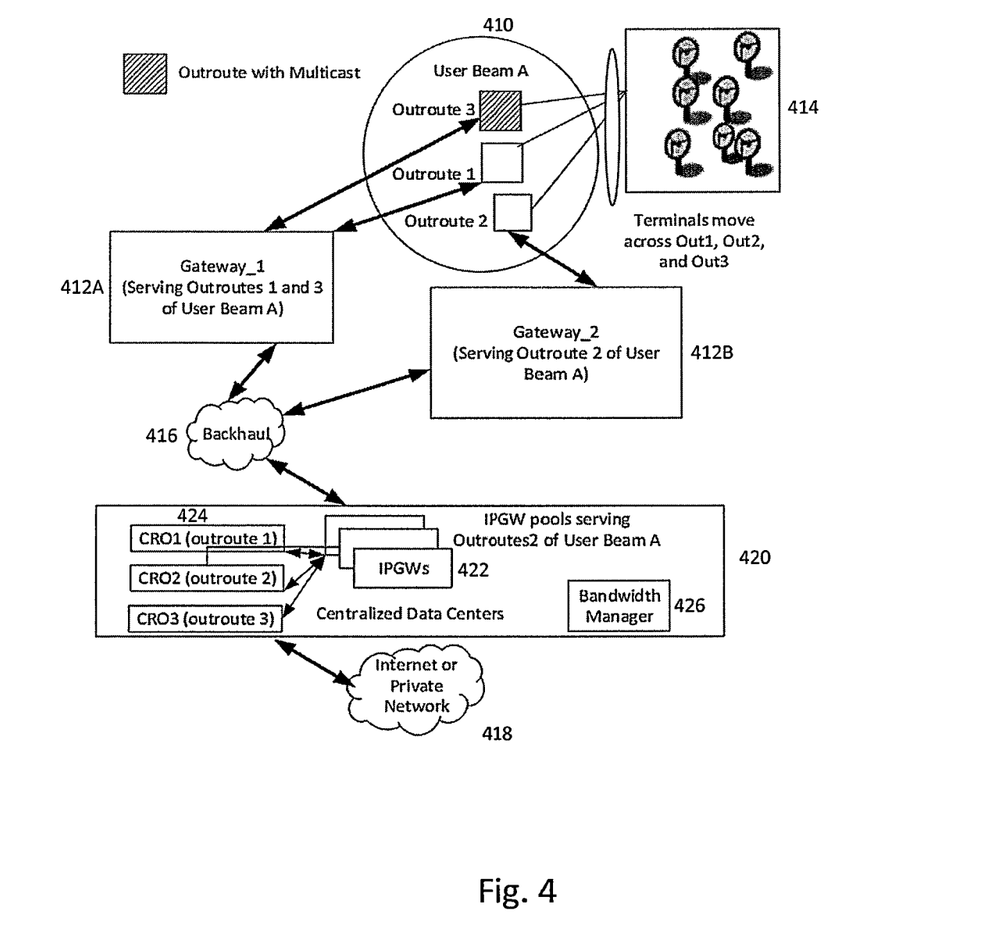
FIG. 4 is a diagram for illustrating load balancing of unicast and multicast traffic, according to various embodiments.

FIG. 4 illustrates a system 400 for load balancing of unicast and multicast traffic, according to an embodiment. The system 400 includes one or more coverage beams 410 (only one shown) which provide communication by means of one or more outroutes. As illustrated in FIG. 4, illustrated coverage beam 410 includes outroute_1, outroute_2, and outroute_3. It should be noted, however, that the number of outroutes is only intended to be illustrative, and in no way limiting. The coverage beams (or beams) 410 can be configured such that they include more outroutes or less outroutes. Although not shown in FIG. 4, the system 400 includes at least one satellite which generates the beams 410 to facilitate a bent pipe communication path.

According to the embodiment illustrated in FIG. 4, the outroutes of the coverage beam 410 are served by two gateways, namely gateway_1 412A and gateway_2 412B. Although only two gateways 412 are shown, it should be noted that other implementations can incorporate additional gateways depending on the system configuration and requirements. Gateway_1 412A is configured to serve outroute_1 and outroute_3, while gateway_2 412B is configured to serve outroute_2. Furthermore, outroute_3 is designated for supplying multicast traffic. In order to support the use of multiple gateways 412 managing traffic within the same beam, the system 400 can include a satellite having flexible and/or reconfigurable payload capabilities.

The gateways 412 can connect to a network, such as a backhaul network 416, in order to establish communication with one or more centralized data centers 418 such as the NMS shown in FIG. 1. The gateways 412 can also utilize public/private networks 418 to communicate with the data center 420. According to the illustrated embodiment, the data center 420 can include one or more IP gateways (IPGW) 422, one or more code rate organizers (CRO) 424, and a bandwidth manager 426. The IPGW 422 is configured to provide layer-2 and layer-3 functionality by processing packets transmitted to, and received from, the internet 418.

According to the illustrated embodiment, at least one IPGW 422 is configured with multi-outroute capabilities. A single IPGW 422 can therefore be used to serve outroutes that are fed from two different gateways. Such a configuration differs from prior systems where a particular beam can only be served by a single gateway. In such prior systems, both or all outroutes across which load balancing occurs must be fed from the same gateway and thus the same RFT. The multi-outroute IPGW 422 illustrated in FIG. 4, however, advantageously allows terminals 414 to maintain TCP connections intact with PEP functionality because they remain on the same IPGW 422 even if the outroute move triggers a gateway switch.

The CRO 424 is configured to determine the modulation and coding (ModCod) applied to the signal stream in order to generate an output signal which optimizes spectrum utilization. The CRO 424 can also estimate bandwidth capacity and arrange incoming data from the IPGW 422 into a data stream which is subsequently transmitted to the terminals 414. The bandwidth manager 426 is configured to allocate bandwidth for all terminals 414 supported by the two gateways 412. Depending on the specific implementation, the data center 420 can be collocated with one of the gateways 412. Furthermore, the functionality of the data center 420 can also be incorporated into hardware and/or software components of either gateway 412.

According to various embodiments, the system 400 can be configured to assign multicast outroutes in either a static or dynamic manner. For static assignment, the system 400 (particularly the data center 420) can designate a particular outroute for all multicast traffic (or multicast services) either permanently or for an extended period. Any terminal 414 wishing to receive multicast services would need to first identify and register with the gateway (412A or 412B) responsible for managing the multicast outroute. The terminal 414 would then move to the designated outroute (or multicast outroute). If the IPGW 422 includes multi-outroute capabilities, movement between different gateways 412 would be transparent to the terminals when a change in outroute occurs.

For dynamic assignment, the IPGW 422 automatically selects or designates an outroute for multicast traffic. The IPGW 422 then announces on all outroutes within the beam 410 that the multicast is coming over the designated outroute. The IPGW 422 can also announce the gateway responsible for managing the designated outroute. All terminals 414 interested in receiving the multicast would identify the gateway 412 managing the designated outroute (if it is not announced), register with the gateway, and move to the designated outroute. Movement between different gateways 412 would be transparent to the terminals 414 when a change in outroute occurs, if the system 400 includes at least one IPGW 422 which has multi-outroute capabilities.

According to the illustrated embodiment, the system 400 can perform load balancing routines that are initiated by either a terminal or the network. Terminal initiated load balancing can be dynamically performed on a per terminal basis, using load metrics received from the data center 420. Each terminal 414 utilizes this information to independently determine if it is currently in an outroute with a high traffic load, and initiates load balancing. If the necessary threshold criteria is satisfied, the terminal 414 can move to a destination outroute corresponding to the outroute having the lowest traffic load. In addition to the features described in the embodiment illustrated in FIG. 2, the terminal 414 must determine if the destination outroute is managed by a different gateway from its current gateway. According to various embodiments, the data center 420 can also establish predetermined intervals at which terminals 414 can check the first threshold to see if load balancing should be performed. Multiple intervals can also be established such that groups of terminals 414 check the first threshold to see if load balancing should be performed instead of all terminals simultaneously or randomly.

As previously discussed, multiple thresholds can be established in order to trigger different types of load balancing. If a second threshold is reached, a network initiated load balancing routine can be implemented. For example, the gateway 412 and/or data center 420 can initiate the load balancing routine to select terminals that are eligible for moving. According to an embodiment, the data center 420 can monitor IGMP or MLD join messages from the terminals 414 in order to determine which will be receiving multicast sessions. The network initiated load balancing routine would not move any of the terminals 414 determined to be receiving the multicast sessions from the multicast outroute. According to one or more embodiments, the data center 420 can prevent or reduce overload of an outroute or beam with only multicast traffic by establishing a threshold CIR for each multicast outroute. The threshold can be statically configured or derived based on the available estimated capacity of a beam 410 and the portion of the beam that can be used for multicast traffic. Different beams 410 can also have different configurations and maximum allowed CIR for multicast traffic.

Since multiple gateways 412 are used to manage the outroutes, the data center can identify the gateway managing the destination outroute for each selected terminal that must be moved. If the destination outroute of a terminal 414 is managed by a different gateway from the terminal's current gateway, the terminal 414 must be associated, or registered, with the gateway of the destination outroute prior to moving. According to one or more embodiments, the data center 420 can include one or more multi-outroute IPGWs 422 capable of transparently facilitating terminal transition from one gateway to another.

Figure 5:
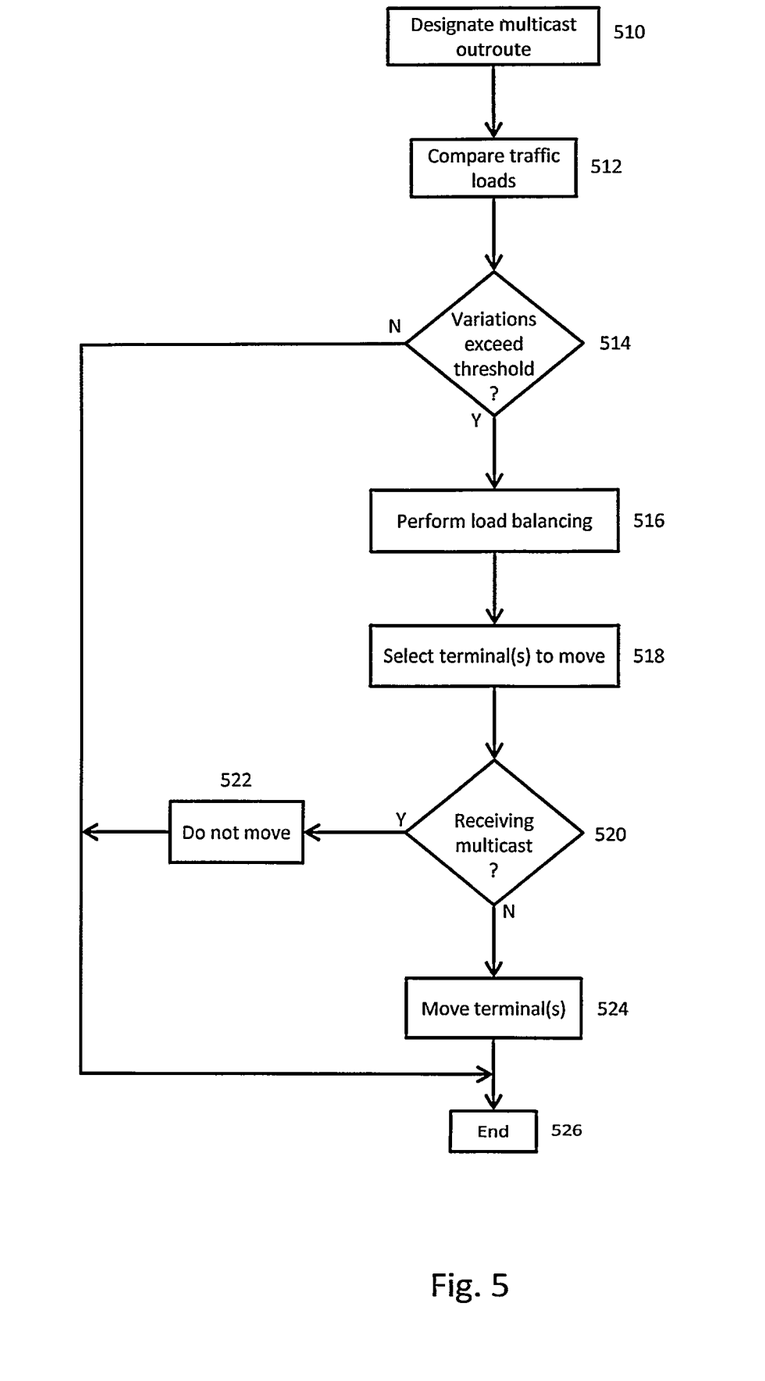
FIG. 5 is a flowchart of a process for load balancing of unicast and multicast traffic, according to one embodiment.

FIG. 5 is a flowchart illustrating steps for performing load balancing on beams having both unicast and multicast traffic. At 510, a multicast outroute is designated from a plurality of outroutes within a beam. According to one or more embodiments, more than one multicast outroute can be designated. At 512, the traffic loads of each outroute within the beam are compared. As previously discussed, the data center can generate a load metric for each outroute within the beam, and subsequently transmit the load metrics to all terminals. Accordingly, each terminal would be capable of comparing the traffic load associated with each outroute contained in the beam.

At 514, it is determined whether the variations in the traffic loads of all outroutes exceed a predetermined threshold. According to an exemplary embodiment, the predetermined threshold can be based on a difference between the outroute having the highest traffic load and the outroute having the lowest traffic load, between the traffic load of an outroute in which a particular terminal is currently located and the outroute having the lowest traffic load, etc. Those skilled in the art can select the specific details of setting the threshold based on desired system configuration, level of precision, etc. If the threshold is set for 15%, for example, the terminal can check to see if the variation between the traffic load of its current outroute is greater than 15% of the outroute having the lowest traffic load. If the variation does not exceed the threshold, then it is not necessary to perform any load balancing, and the process would end. If the variation exceeds the threshold, then a load balancing routine is performed at 516.

At 518, one or more terminals are selected to be moved from a current outroute to a destination outroute. At 520, it is determined whether the selected terminal, or terminals, is currently receiving multicast traffic. If any of the terminals is currently receiving multicast traffic, control passes to 522. These terminals are not moved because such a movement would interrupt the multicast traffic currently being received. Accordingly, the system can be configured to override any load balancing activities that would move such terminals. The process would subsequently end.

If it is determined, however, that the selected terminals are not receiving multicast traffic, then control passes the 524. The selected terminals are then moved to a destination outroute. For example, if the load balancing routine is initiated by a predetermined terminal, then only the predetermined terminal would be selected to move to the destination outroute. If the load balancing routine is initiated by the network, however, then some terminals may be selected for moving, while other terminals may be ineligible for moving. The selected terminals can also be moved to different destination outroutes, as appropriate to balance the traffic loads across all outroutes within the beam. The process ends at 526.

Figure 6A:
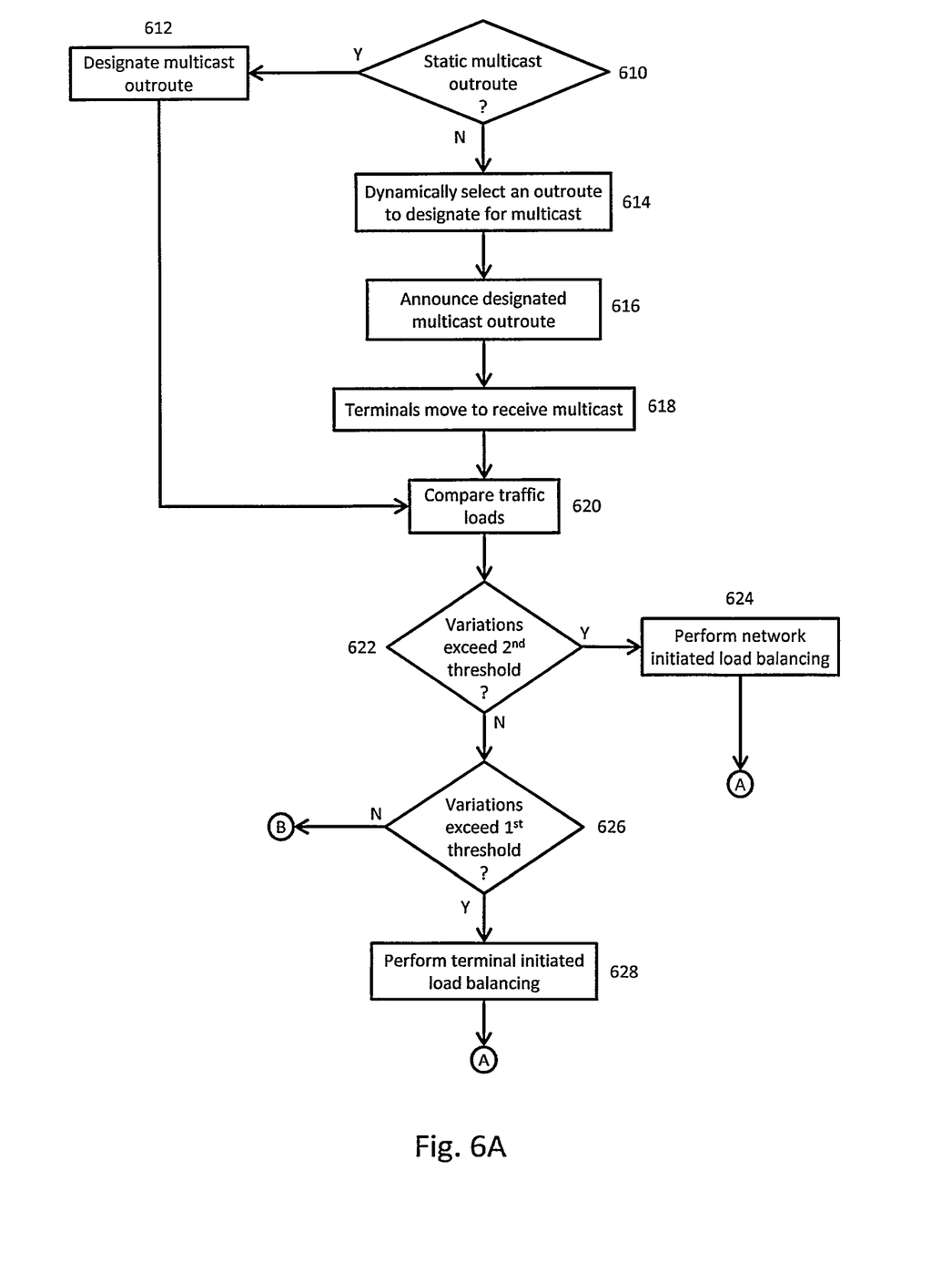
FIGS. 6A and 6B are a flowchart of a process for load balancing of unicast and multicast traffic, according to various embodiments.
Figure 6B:
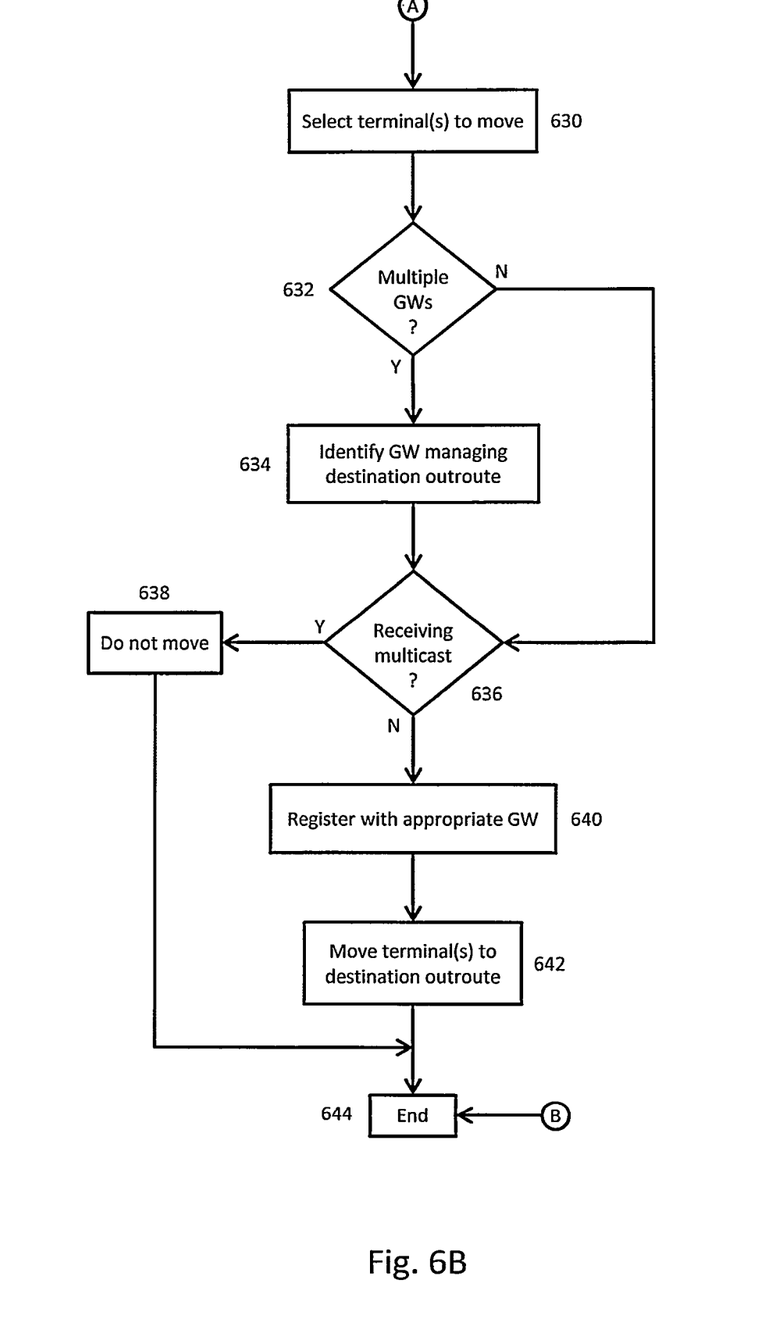

FIG. 6 is a flowchart illustrating steps for performing load balancing on beams having both unicast and multicast traffic, in accordance with various embodiments. At 610, it is determined whether a static multicast outroute is desired. If a static multicast outroute is desired, then control passes to 612. The system designates a particular outroute for carrying multicast traffic. If a static multicast outroute is not desired, then control passes to 614. The system dynamically selects an outroute to designate for carrying multicast traffic. The outroute can be designated to carry multicast traffic for a specific length of time (e.g., 2 hrs.) or desired time slot (e.g., 8 pm-9 pm). At 616, the system announces the designated multicast outroute to all terminals within the beam. The announcement can include all necessary details for receiving the multicast traffic. For example, if the multicast traffic will contain premium content that must be purchased in advance, certain information required to authenticate the purchase can also be included in the announcement.

At 618, any terminals interested in receiving, or qualified to receive, the multicast traffic move from their current outroute to the outroute designated for multicast traffic. At 620, traffic loads from all outroutes within the beam are compared to each other. As previously discussed, this can be facilitated based on the data center supplying load metrics for all outroutes to the terminals in the beam. At 622, it is determined whether variations in the traffic loads of the different outroutes exceed a second threshold. According to the illustrated embodiment, the second threshold can be the higher of 2 predetermined threshold values set by the system or an operator. Thus, if the second threshold is set at 25%, then the first threshold would have to be a lower value, such as 10% or 15%.

If it is determined that the variations exceed the second threshold, then control passes to 624 where a network initiated load balancing routine is performed. Control then transfers to 630. If the variations do not exceed the second threshold, then control passes to 626. At 626, it is determined whether variations in traffic loads exceed a first threshold. If the variations do not exceed the first threshold, then control transfers to 644 where the process ends. If the variations exceed the first threshold, however, then a terminal initiated load balancing routine is performed at 628. As previously discussed, the first threshold is lower than the second threshold. Thus, a higher threshold is established for the system to intervene for any load balancing in order to provide an opportunity for the terminals to redistribute themselves.

At 630, terminals that are eligible for moving are selected. If a terminal initiated load balancing routine was performed, then only one terminal would be selected for movement. As previously discussed, terminal initiated load balancing is independently performed by each terminal. Accordingly, only one terminal would be eligible for movement if the first threshold is exceeded. If the load balancing routine is initiated by the network, then multiple terminals may be eligible for movement. At 632, it is determined whether multiple gateways are being used to manage the outroutes within the beam. If a single gateway is being used, then control passes to 636. If multiple gateways are being used, then the gateway managing the destination outroute for each terminal is identified at 634.

According to one or more embodiments, steps 632 and 634 can be omitted if the data center includes one or more multi-outroute capable IPGWs. At 636, it is determined whether any of the selected terminals are currently receiving multicast traffic. If any of the selected terminals are currently receiving multicast traffic, then they are not eligible for movement. This is indicated at 638. Network initiated load balancing can therefore include some terminals that are eligible for moving and others that ineligible because they are currently receiving multicast traffic.

At 640, each terminal selected for moving registers or associates itself with the appropriate gateway, if the destination outroute is managed by a different gateway from the terminal's current gateway. If only one gateway is used, or the data center includes a multi-outroute capable IPGW, then it may not be necessary to register with the gateway. More particularly, if a single gateway is being used, then all terminals have already been registered with the gateway. If multiple gateways are being used, various embodiment provide for a multi-outroute IPGW configured to transparently facilitate the terminal transition from one gateway to another. At 642, all of the selected terminals are moved to the destination outroute. As previously discussed, if a terminal initiated load balancing routine is performed, only one terminal would be eligible for moving. If the load balancing routine is network initiated, then multiple terminals may be eligible for movement. Furthermore, such eligible terminals can be moved to different outroutes within the beam in order to balance the traffic loads. The process ends at 642.

The disclosed load balancing features are applicable to both physical outroute or to outroute streams on a physical outroute. For example, a physical outroute can contain multiple streams. One stream can be allocated to carry multicast traffic, while the remaining streams of the physical outroute are used to carry unicast traffic. The data center can subsequently announce details pertaining to the stream that will carry the multicast traffic. If the system incorporates beam hopping functionality, the same multicast can be sent through only one feeder uplink and terminals on multiple beams can receive it by configuring the satellite to replicate the multicast. According to various embodiments, the disclosed systems can be configured to identify the extended failure of an outroute providing the multicast service vs. the transient loss of an outroute due to rain attenuation. If the multicast outroute goes away due to extended failure, terminals can automatically move to another outroute for point to point service, thereby preventing being stuck without service on an outroute that is not available. The terminal can check the status of the outroute periodically, and move back when the outroute recovers. On the other hand, if the outroute goes away due to rain attenuation, the terminal would not move away from the multicast outroute and will only experience a temporary outage period.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described terminals, receivers, transmitters, transceivers, gateway, data center, bandwidth manager, IPGW, CRO, NMS, baseband components, etc. Additionally, such hardware can be interfaced to connect and/or facilitate communication between different components such as the CRO, IPGW, and bandwidth manager.

Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation: single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
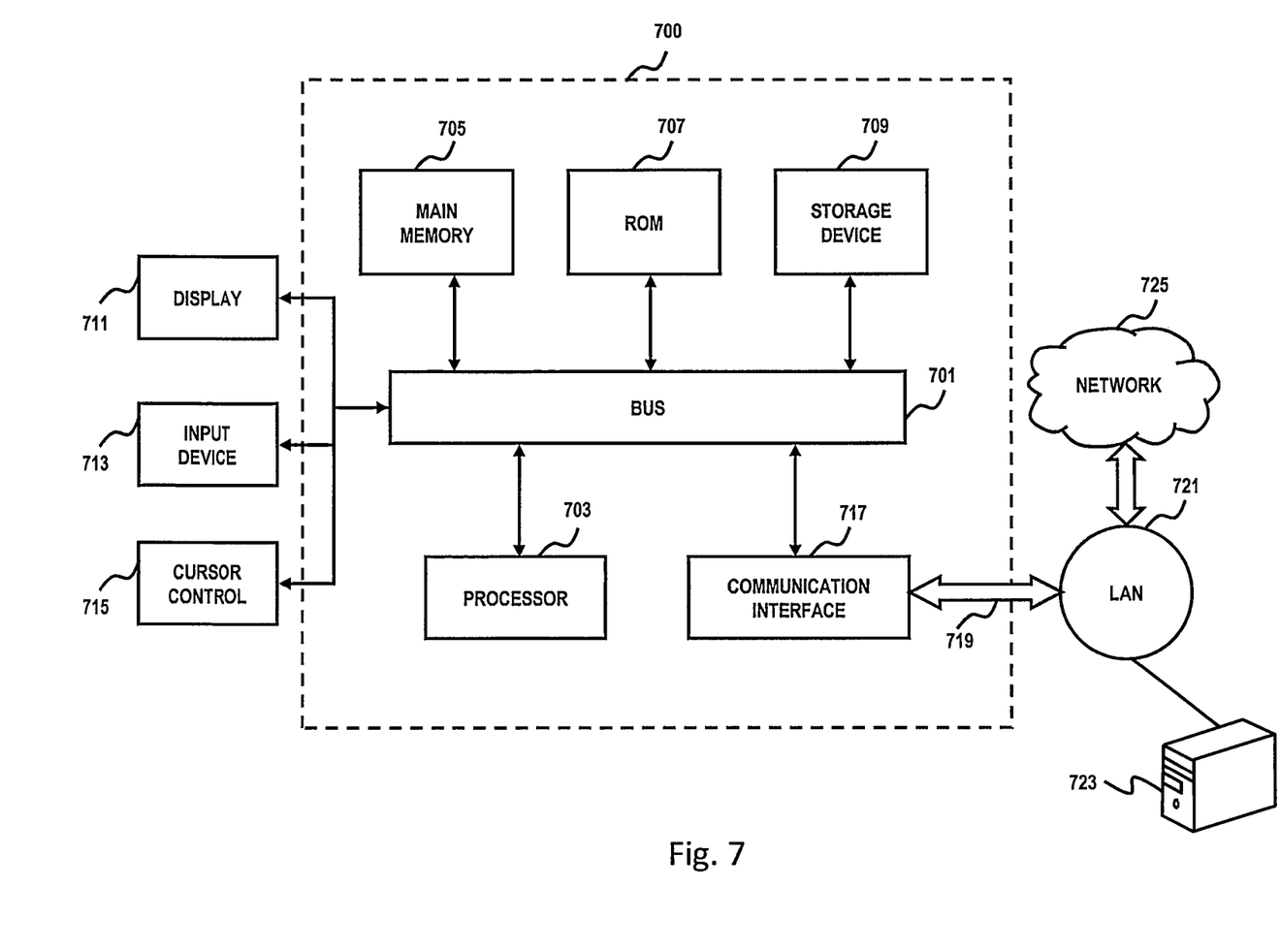
FIG. 7 is a diagram of a computer system that can be used to implement various exemplary features and embodiments.

FIG. 14 is a diagram of a computer system that can be used to implement features of various embodiments. The computer system 1400 includes a bus 1401 or other communication mechanism for communicating information and a processor 1403 coupled to the bus 1401 for processing information. The computer system 1400 also includes main memory 1405, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a light emitting diode (LED) or other flat panel displays, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411. Additionally, the display 1411 can be touch enabled (i.e., capacitive or resistive) in order facilitate user input via touch or gestures.

According to an exemplary embodiment, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement exemplary embodiments. Thus, exemplary embodiments are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a High Definition Multimedia Interface (HDMI), etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 such as a wide area network (WAN) or the Internet. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an exemplary embodiment through the network 1425, the local network 1421 and the communication interface 1417. The processor 1403 may execute the transmitted code while being received and/or store the code in the storage device 1409, or other non-volatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to non-volatile media, volatile media, and transmission media. Non-volatile media include, for example, optical or magnetic disks, such as the storage device 1409. Non-volatile media can further include flash drives, USB drives, microSD cards, etc. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
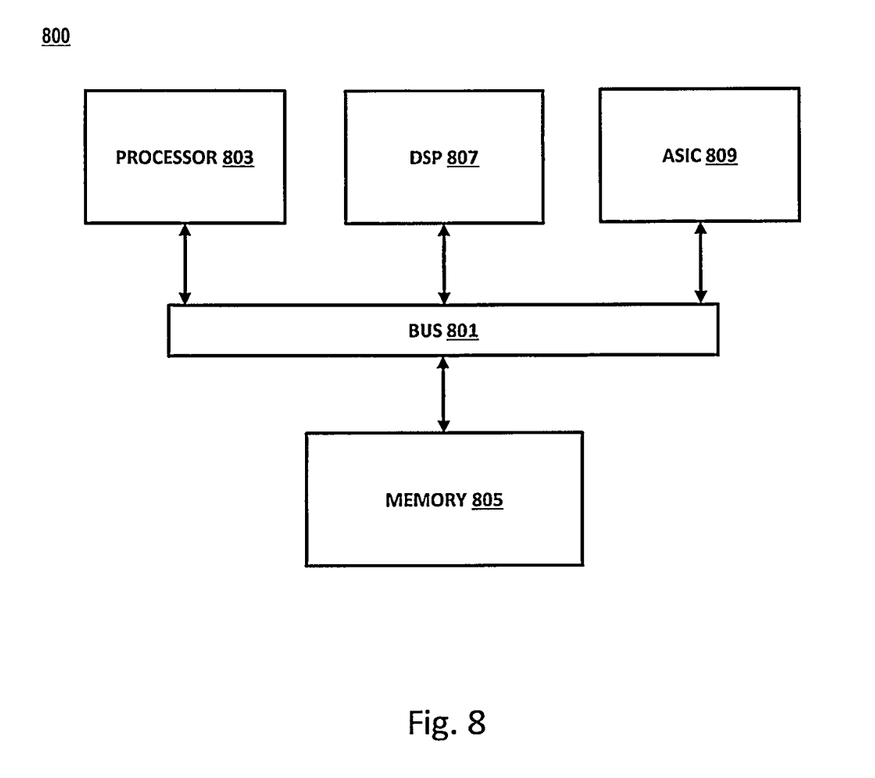
FIG. 8 is a diagram of a chip set that can be used to implement various exemplary features and embodiments.

FIG. 15 illustrates a chip set 1500 upon which features of various embodiments may be implemented. Chip set 1500 is programmed to implement various features as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of the figures.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1505 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
designating an outroute for supplying at least multicast traffic within a beam of a satellite communication system;
comparing traffic loads on all outroutes within the beam, including the designated outroute;
determining if variations in the traffic loads exceed a predetermined threshold;
performing a load balancing routine, if the variations exceed the predetermined threshold, to redistribute the traffic loads on all outroutes by moving at least one terminal to a destination outroute; and
excluding, from the load balancing routine, any terminal in the designated outroute that is actively receiving the multicast traffic.

2. The method of claim 1, wherein:
the load balancing routine is terminal initiated; and
the at least one terminal is receiving only unicast traffic.

3. The method of claim 1, wherein performing a load balancing routine further comprises:
replicating all traffic associated with the at least one terminal over a source outroute; and
supplying the replicated traffic to the destination outroute prior to moving the at least one terminal.

4. The method of claim 1, wherein outroutes within the beam are managed by multiple gateways, and performing a load balancing routine further comprises:
identifying the gateway managing the destination outroute for the at least one terminal;
registering the at least one terminal with the identified gateway; and
moving the at least one terminal to the destination outroute.

5. The method of claim 1, further comprising:
selecting a least robust ModCod supported by all terminals in the designated outroute, wherein the selected ModCod maintains predetermined link conditions.

6. The method of claim 5, wherein the selected ModCod is dynamically adjusted to improve link conditions of the designated outroute, size of the designated outroute, or both.

7. The method of claim 1, wherein the designated outroute is statically assigned to supply the multicast traffic.

8. The method of claim 1, wherein designating an outroute further comprises:
dynamically selecting an outroute within the beam for supplying the multicast traffic; and
announcing, to all outroutes within the beam, designation of the selected outroute for supplying multicast traffic and parameters for receiving the multicast traffic,
wherein terminals independently move to the designated outroute to receive the multicast traffic.

9. The method of claim 8, wherein the designated outroute supplies the multicast traffic for a predetermined time interval.

10. The method of claim 1, performing a load balancing routine further comprises:
determining if variations in the traffic loads across all terminals exceed a second predetermined threshold; and
performing a network initiated load balancing routine.

11. The method of claim 10, wherein the second predetermined threshold is higher than the predetermined threshold.

12. The method of claim 1, wherein excluding any terminal further comprises identifying terminals actively receiving the multicast traffic based on previously transmitted session join messages.

13. The method of claim 1, further comprising:
determining if a difference between the traffic load on the designated outroute and an average of the traffic loads on all other outroutes within the beam exceeds a third threshold; and
reconfiguring one or more of a size, position, and configuration of the beam to accommodate higher demand for the multicast traffic.

14. The method of claim 13, further comprising:
designating a second outroute for supplying the multicast traffic; and
replicating, at a satellite, the multicast traffic for the designated second outroute.

15. The method of claim 14, further comprising transmitting the replicated multicast traffic from the satellite to at least one additional beam.

16. The method of claim 1, further comprising:
detecting a service interruption in the designated outroute; and
determining whether the service interruption is a result of an extended failure of the designated outroute or a transient loss from signal attenuation.

17. The method of claim 16, wherein the signal loss is a result of an extended failure, and further comprising:
moving terminals currently on the designated outroute to a different outroute;
reestablishing unicast traffic on the different outroute; and
periodically checking if service on the designated outroute has resumed.

18. The method of claim 16, further comprising:
remaining on the designated outroute if the service interruption is a transient loss from signal attenuation; and
initiating a temporary outage period for the terminal.

19. The method of claim 1, wherein each physical outroute contains a plurality of streams.

20. The method of claim 19, further comprising:
designating one or more streams from the physical outroute for supplying the multicast traffic; and
designating the remaining streams from the physical outroute for supplying unicast traffic.

* * * * *